(12) United States Patent
Ishimaru (10) Patent No.: US 10,236,129 B2
(45) Date of Patent: Mar. 19, 2019

(54) METHOD FOR MANUFACTURING ELECTROLYTIC CAPACITOR

(71) Applicant: Panasonic Intellectual Property Management Co., Ltd., Osaka (JP)

(72) Inventor: Yoshiaki Ishimaru, Yamaguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/412,769

(22) Filed: Jan. 23, 2017

(65) Prior Publication Data

US 2017/0133160 A1 May 11, 2017

Related U.S. Application Data

(63) Continuation of application No. PCT/JP2015/003691, filed on Jul. 23, 2015.

(30) Foreign Application Priority Data

Aug. 6, 2014 (JP) .................................. 2014-160511

(51) Int. Cl.
*H01G 9/00* (2006.01)
*H01G 9/028* (2006.01)
*H01G 9/055* (2006.01)

(52) U.S. Cl.
CPC .......... *H01G 9/0036* (2013.01); *H01G 9/0032* (2013.01); *H01G 9/028* (2013.01); *H01G 9/055* (2013.01)

(58) Field of Classification Search
None
See application file for complete search history.

(56) References Cited

U.S. PATENT DOCUMENTS

2001/0030848 A1   10/2001   Shoji et al.
2008/0002334 A1   1/2008   Kakuma et al.
(Continued)

FOREIGN PATENT DOCUMENTS

| CN | 103289399 A | 9/2013 |
| JP | 2013-172142 | 9/2013 |
| WO | 2007/091656 | 8/2007 |

OTHER PUBLICATIONS

International Search Report of PCT application No. PCT/JP2015/003691 dated Sep. 29, 2015.
(Continued)

*Primary Examiner* — Seahvosh Nikmanesh
(74) *Attorney, Agent, or Firm* — McDermott Will & Emery LLP (57) ABSTRACT

A method for manufacturing an electrolytic capacitor according to the present disclosure includes a first step to a third step described below. The electrolytic capacitor includes an anode body having a dielectric layer, and a solid electrolyte layer formed on a surface of the dielectric layer. The first step is a step of preparing a first treatment solution by dissolving or dispersing a conductive polymer in a liquid first component and leaving a conductive polymer solution or a conductive polymer dispersion liquid to stand for a first period. The second step is a step of preparing a second treatment solution by mixing the first treatment solution with a second component. The third step is a step of forming a solid electrolyte layer on a surface of the dielectric layer by applying the second treatment solution to the surface of the dielectric layer.

6 Claims, 2 Drawing Sheets

(56) References Cited

U.S. PATENT DOCUMENTS

| | | |
|---|---|---|
| 2009/0021894 A1 | 1/2009 | Ning et al. |
| 2011/0119879 A1* | 5/2011 | Ishimaru ............ H01G 9/0029 29/25.41 |
| 2012/0212880 A1 | 8/2012 | Ishimaru et al. |
| 2013/0222978 A1 | 8/2013 | Sugawara et al. |

OTHER PUBLICATIONS

English Translation of Chinese Search Report dated Apr. 25, 2018 for the related Chinese Patent Application No. 201580040571.0.

* cited by examiner

METHOD FOR MANUFACTURING ELECTROLYTIC CAPACITOR

BACKGROUND

1. Technical Field

The present disclosure relates to a method for manufacturing an electrolytic capacitor, and, in more detail, relates to a method for manufacturing an electrolytic capacitor having low equivalent series resistance (ESR) characteristics.

2. Description of the Related Art

Along with digitalization of electronic devices, compactification, large capacity, and low equivalent series resistance (ESR) in a high frequency range have been required of capacitors used in the electronic devices.

Promising candidates as small-sized, large capacity, and low ESR capacitors are electrolytic capacitors including as a cathode material a conductive polymer such as polypyrrole, polythiophene, polyfuran, or polyaniline. Proposed is, for example, a capacitor element that includes a solid electrolyte layer as a cathode material provided on a dielectric layer-formed anode foil.

In the solid electrolyte layer, various additives for modifying, for example, a coating property, a film-forming property, stability, adhesion to a base material, and conductivity of a conductive polymer are blended to improve characteristics of the electrolytic capacitor (see Patent Literature 1).

CITATION LIST

Patent Literature

PTL 1: WO 2007/091656

SUMMARY

Even with application of an additive to a solid electrolyte layer, however, an adequate effect of reducing an ESR cannot sometimes be obtained.

A first aspect of the present disclosure is a method for manufacturing an electrolytic capacitor that includes an anode body having a dielectric layer, and a solid electrolyte layer formed on a surface of the dielectric layer, the method including a first step, a second step, and a third step that are described below. The first step is a step of preparing a first treatment solution by dissolving or dispersing a conductive polymer in a liquid first component, and leaving a conductive polymer solution or a conductive polymer dispersion liquid to stand for a first period. The second step is a step of preparing a second treatment solution by mixing the first treatment solution with a second component. The third step is a step of forming a solid electrolyte layer on a surface of the dielectric layer by applying the second treatment solution to the surface of the dielectric layer. Here, the second component is at least one component different from the conductive polymer and the first component, and the first period is longer than a second period from a start of the second step to a start of the third step.

According to the present disclosure, there can be provided an electrolytic capacitor in which ESR is reduced.

DETAILED DESCRIPTION

Hereinafter, the present disclosure is described in more detail according to an exemplary embodiment. The exemplary embodiment below, however, is not for limiting the present disclosure.

<<Electrolytic Capacitor>>

Figure 1:
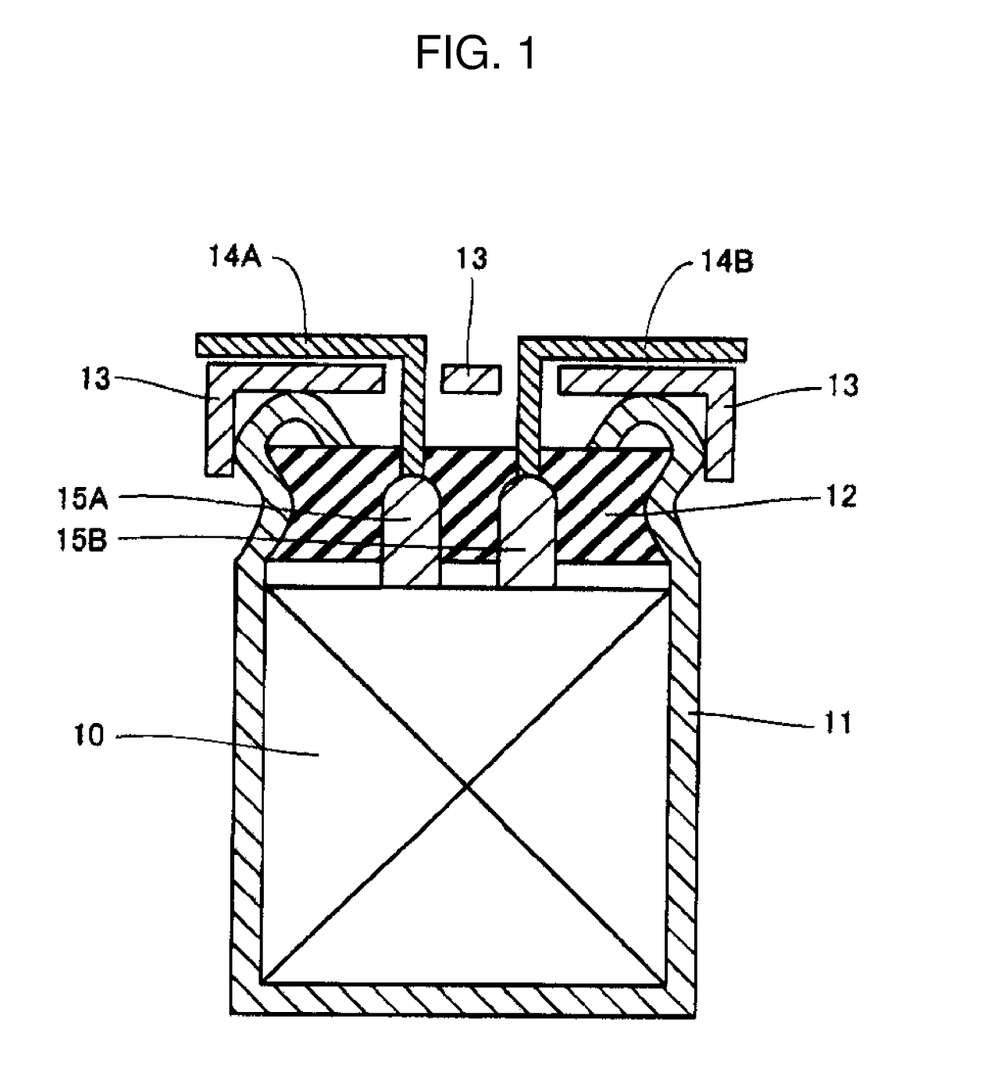
FIG. 1 is a schematic sectional view of an electrolytic capacitor according to an exemplary embodiment of the present disclosure.
Figure 2:
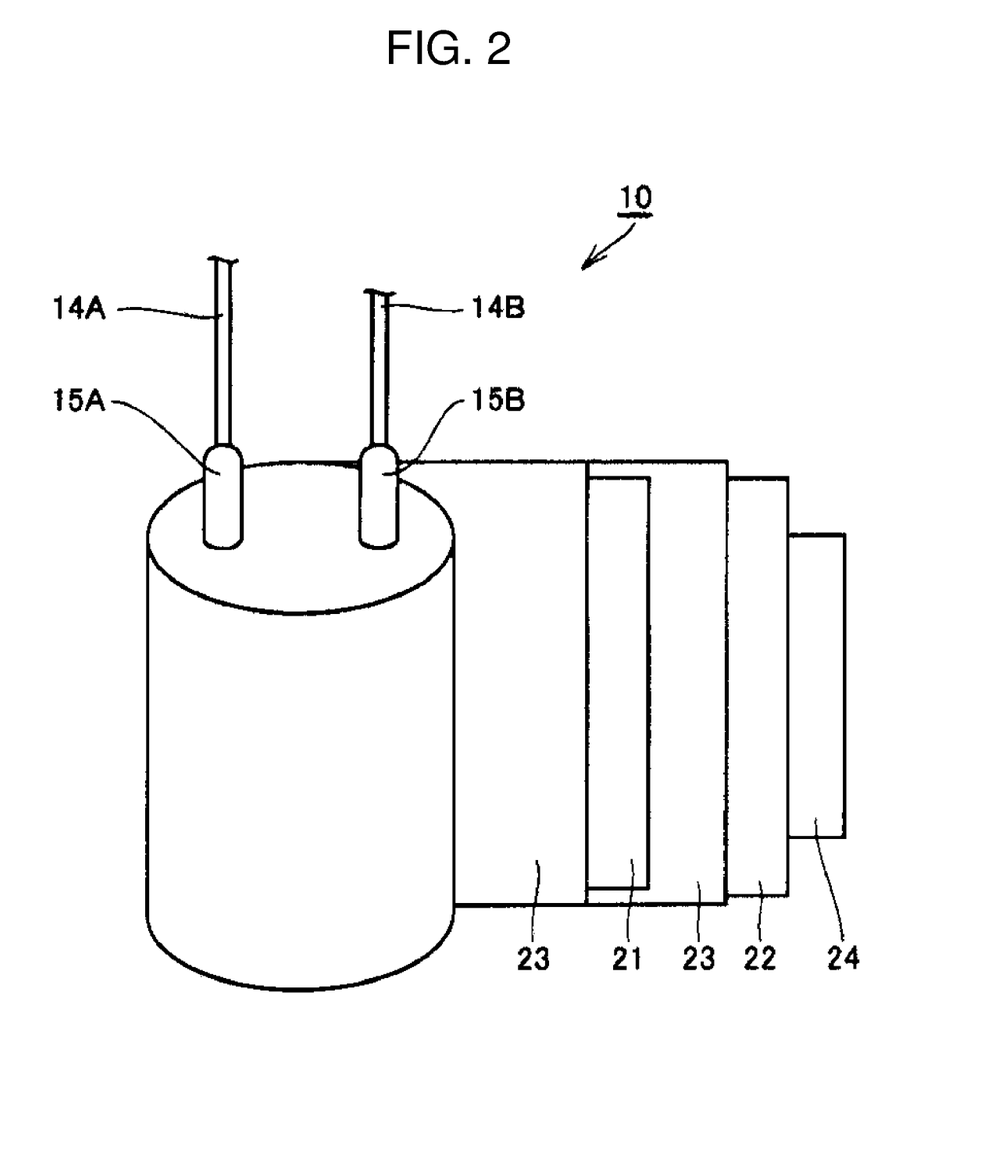
FIG. 2 is a schematic view illustrating a configuration of a capacitor element included in the same exemplary embodiment.

FIG. 1 is a schematic sectional view of an electrolytic capacitor obtained by a manufacturing method according to the present exemplary embodiment, and FIG. 2 is a schematic view of a partially developed capacitor element of the same electrolytic capacitor.

In FIG. 1, the electrolytic capacitor includes capacitor element 10, bottomed case 11 that houses capacitor element 10, sealing member 12 that seals an opening of bottomed case 11, and base plate 13 that covers sealing member 12. The electrolytic capacitor further includes lead wires 14A, 14B that are lead out from sealing member 12 and penetrate base plate 13, and lead tabs 15A, 15B that connect the lead wires to electrodes of capacitor element 10, respectively. Bottomed case 11 is, at a part near an opening end, processed inward by drawing, and is, at the opening end, swaged to sealing member 12 for curling.

Capacitor element 10 is produced from a wound body as shown in FIG. 2. The wound body refers to one in which solid electrolyte layer 34 including a conductive polymer is not formed between anode body 21 having a dielectric layer on a surface of the anode body and cathode body 22. The wound body includes, for example, anode body 21 connected to lead tab 15A, cathode body 22 connected to lead tab 15B, and separator 23. Anode body 21 and cathode body 22 are wound with separator 23 interposed between the anode body and the cathode body. An outermost periphery of the wound body is fixed with fastening tape 24. FIG. 2 shows a partially developed wound body before the outermost periphery of the wound body is fixed.

Anode body 21 includes a metal foil whose surface is roughened so as to include projections and recesses, and a dielectric layer is formed on the metal foil having the projections and recesses.

Capacitor element 10 includes a solid electrolyte layer formed between anode body 21 and cathode body 22 of the wound body. The solid electrolyte layer covers at least a part of a surface of the dielectric layer formed on anode body 21, and may also cover at least a part of a surface of cathode body 22 and/or a surface of separator 23. Capacitor element 10 may be housed together with a nonaqueous solvent or an electrolyte solution in an outer case that forms of, for example, bottomed case 11 and sealing member 12.

<<Method for Manufacturing Electrolytic Capacitor>>

Hereinafter, an example of the method for manufacturing an electrolytic capacitor according to the present exemplary embodiment is described according to each of steps.

(i) Step of Preparing Anode Body 21 Having Dielectric Layer

First, a raw material of anode body 21, i.e. a metal foil is prepared. A type of the metal is not particularly limited, but it is preferable to use a valve action metal such as aluminum, tantalum, or niobium, or an alloy including a valve action metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a DC electrolytic method or an AC electrolytic method.

Next, a dielectric layer is formed on the roughened surface of the metal foil. A method for forming the dielectric layer is not particularly limited, and the dielectric layer can be formed by subjecting the metal foil to a chemical conversion treatment. In the chemical conversion treatment, for example, the metal foil is immersed in a chemical conversion solution such as an ammonium adipate solution, followed by a heat treatment. The metal foil may be immersed in a chemical conversion solution, followed by application of a voltage.

Normally, a large foil of, for example, a valve action metal (metal foil) is subjected to a roughening treatment and a chemical conversion treatment from the viewpoint of mass productivity. In this case, the treated foil is cut into a desired size to prepare anode body 21.

(ii) Step of Preparing Cathode Body 22

A metal foil can also be used for cathode body 22 as with the anode body. A type of the metal is not particularly limited, but it is preferable to use a valve action metal such as aluminum, tantalum, or niobium, or an alloy including a valve action metal. A surface of cathode body 22 may be roughened as necessary.

(iii) Production of Wound Body

Next, a wound body is produced with anode body 21 and cathode body 22.

First, anode body 21 and cathode body 22 are wound with separator 23 interposed between the anode body and the cathode body. At this time, the winding can be conducted while lead tabs 15A, 15B are rolled in the anode body, the cathode body, and the separator, to cause lead tabs 15A, 15B to stand up from the wound body as shown in FIG. 2.

As a material for separator 23, for example, a nonwoven fabric can be used which includes, as a main component, a fiber of cellulose, nylon, polyethylene terephthalate, vinylon, aramid, or the like.

A material for lead tabs 15A, 15B is not particularly limited as long as the material is a conductive material. A material for lead wires 14A, 14B connected to lead tabs 15A, 15B, respectively, is not also particularly limited, and, for example, a conductive material may be used.

Then, fastening tape 24 is disposed on an outer surface of cathode body 22 positioned at an outermost layer of wound anode body 21, cathode body 22, and separator 23, to fix an end of cathode body 22 with fastening tape 24. When anode body 21 is prepared by cutting a large metal foil, the wound body may further be subjected to a chemical conversion treatment in order to provide a dielectric layer on a cut surface of anode body 21.

(iv) Step of Preparing First Treatment Solution (First Step)

A first treatment solution is a treatment solution obtained by dissolving or dispersing a conductive polymer in a liquid first component to form a conductive polymer solution or a conductive polymer dispersion liquid and leaving the conductive polymer solution or the conductive polymer dispersion liquid to stand for a first period.

The conductive polymer solution is a solution obtained by dissolving a conductive polymer in the first component, and the conductive polymer is uniformly distributed in the solution. The conductive polymer dispersion liquid is a dispersion liquid obtained by dispersing a particulate conductive polymer in the first component. The conductive polymer dispersion liquid can be obtained by, for example, a method for dispersing a conductive polymer in the first component, or a method for polymerizing a precursor monomer of a conductive polymer in the first component to generate particles of the conductive polymer in the first component.

Examples of the conductive polymer include conjugated polymers such as polypyrrole, polythiophene, polyfuran, polyaniline, polyacetylene, polyphenylene, polyphenylene vinylene, polyacene, and polythiophene vinylene. A single one or two or more in combination of these conductive polymers may be used, or a copolymer of two or more monomers may also be used.

In the present specification, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like may also include their derivatives. For example, polythiophene includes poly(3,4-ethylene dioxythiophene) and the like.

The conductive polymer may include a dopant. Examples of the dopant include polyanions such as polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. A single one or two or more in combination of these polyanions may be used. These polyanions may be a polymer of a single monomer or a copolymer of two or more monomers. Especially, a polyanion derived from polystyrenesulfonic acid is preferable.

A weight average molecular weight of the polyanion is not particularly limited, and ranges, for example, from 1,000 to 1,000,000. A conductive polymer including such a polyanion is likely to form a uniform solid electrolyte layer. When the conductive polymer is, in a state of particles, dispersed in a dispersion solvent, an average particle diameter D50 of the particles preferably ranges from 0.01 µm to 0.5 µm, for example. Here, the average particle diameter D50 is a median diameter in a volume particle size distribution obtained by measurement with a particle size distribution measuring apparatus according to dynamic light scattering.

Concentration of the conductive polymer (including a dopant) in the first treatment solution preferably ranges from 0.5% by mass to 10% by mass. The first treatment solution having such a concentration is suitable for forming a solid electrolyte layer having an appropriate thickness and is easily impregnated into the wound body to give advantages for improvement of productivity.

The first component may be water, a nonaqueous solvent, or a mixture of water and a nonaqueous solvent. The nonaqueous solvent is a collective term for liquids except water, and includes an organic solvent and an ionic liquid. The first component is not particularly limited as long as the first component is not a component that largely changes a property of the first treatment solution over time. A change over time in the property of the first treatment solution attributes to, for example, chemical characteristics of the conductive polymer and the first component. For example, there are cases in which a great change over time is caused and in which a great change over time is not caused according to a kind (characteristic) of the first component even when the first treatment solution includes the same conductive polymer. Therefore, the first component is not to be determined unambiguously.

The first treatment solution may also include, for example, a second component described below to an extent that the property of the first treatment solution is not largely changed over time. For example, the first treatment solution may also include a component which is the same as the second component in a ratio of 0.1% by mass or less. Similarly, a kind of the second component is not to be determined unambiguously. A component corresponding to the second component is changed according to a kind of the conductive polymer or the first component included in the first treatment solution.

The first component may be a protic solvent or an aprotic solvent. Examples of the protic solvent include alcohols such as methanol, ethanol, 1-propanol, butanol, ethylene glycol, propylene glycol, polyethylene glycol, diethylene glycol monobutyl ether, glycerin, and polyglycerin, and water. Examples of the aprotic solvent include amides such as N-methylacetamide, N,N-dimethylformamide, and N-methyl-2-pyrrolidone; esters such as methyl acetate and γ-butyrolactone; ketones such as acetone and methyl ethyl ketone; sulfur-containing compounds such as dimethyl sulfoxide and sulfolane; carbonate compounds such as propylene carbonate; ethers such as 1,4-dioxane; and formaldehyde. As the first component, a single one or two or more in combination of these solvents may be used. These solvents can be included in an amount of more than 50% by mass in the first treatment solution.

Especially, the first component preferably includes water as a main component. The first component includes water in an amount of preferably 50% by mass or more, more preferably 80% by mass or more.

The first treatment solution obtained by dissolving or dispersing the conductive polymer in the first component and leaving a conductive polymer solution or a conductive polymer dispersion liquid to stand for a certain period (first period) is then subjected to a step of mixing with the second component. It has been found that an ESR of the electrolytic capacitor becomes low through use of the first treatment solution that is obtained by dissolving or dispersing the conductive polymer in the first component and leaving a conductive polymer solution or a conductive polymer dispersion liquid to stand for a certain period. The first treatment solution that has been left to stand for a certain period is stable in property, so that a coating property, a film-forming property, or adhesion to a base material is improved. As a result, uniformity of the solid electrolyte layer formed is considered to be improved to reduce the ESR.

Conditions are not particularly limited for leaving a conductive polymer solution or a conductive polymer dispersion liquid to stand for the first period after dissolution or dispersion of the conductive polymer in the first component. For example, a container that contains a solution or a dispersion liquid obtained by dissolving or dispersing the conductive polymer in the first component may be left to stand still at a place under ordinary pressure and under a temperature condition of 2° C. to 40° C. At this time, the container is preferably sealed.

The first period is not particularly limited, but is preferably 24 hours or more, more preferably 72 hours or more from the viewpoint of more stabilizing the property of the first treatment solution. In addition, the first period is preferably 3 months or less. The first period refers to, in other words, a period from the dissolution or dispersion of the conductive polymer in the first component to a time when the first treatment solution is ready for being subjected to the next step of mixing with the second component (immediately before being subjected to the step of mixing). The preparation of the first treatment solution includes storage of the first treatment solution over the first period, acquisition of the first treatment solution that has been stored over the first period, and storage of the first treatment solution over the first period in total by further storing the first treatment solution after acquisition of the first treatment solution that has been stored for a certain period.

(v) Step of Preparing Second Treatment Solution (Second Step)

The first treatment solution is then mixed with the second component to prepare a second treatment solution.

The second component is not particularly limited and is at least one component different from the conductive polymer and the first component. Specifically, the second component is normally various additives used for improving performance of the solid electrolyte layer. A component included in the second component may be the same as a trace component that is included in the first treatment to an extent that the property of the first treatment solution is not largely changed over time (the trace component is, e.g., a component included in the first treatment solution in a ratio of 0.1% by mass or less).

Examples of the second component may include a coupling agent, a surfactant, a coagulant, a conductivity enhancer, a thickener, and a pH adjuster as well as an alcohol, an aprotic solvent, an ester compound, an ether compound, an alkaline compound, an amide compound, and a nitrile compound. As the second component, a single one or two or more in combination of these substances may be used.

Examples of the coupling agent include a silane coupling agent, a titanate coupling agent, and an aluminate coupling agent. Specific examples include γ-glycidoxypropyltrimethoxysilane, 3-aminopropyltrimethoxysilane, and mercaptopropyltrimethoxysilane. Examples of the surfactant include various surfactants such as an anionic surfactant, a cationic surfactant, an ampholytic surfactant, and a non-ionic surfactant. Specific examples include anionic surfactants such as a carboxylate, a sulfonate, a sulfuric acid ester salt, and a phosphoric acid ester salt; cationic surfactants such as an amine salt and a quaternary ammonium salt; ampholytic surfactants such as carboxybetaine, an aminocarboxylate, and imidazolium betaine; and non-ionic surfactants such as a polyoxyethylene alkyl ether, a polyoxyethylene glycerin fatty acid ester, an ethylene glycol fatty acid ester, and a polyoxyethylene fatty acid amide.

The coagulant is a component that coagulates the conductive polymer, and examples of the coagulant include an aprotic solvent and a chelating agent. Examples of the aprotic solvent include the same compounds exemplified as the first component. Examples of the chelating agent include ethylenediaminetetraacetic acid, triethylenediaminetetraacetic acid, diethylenetriaminepentaacetic acid, hydroxyethylenediaminetriacetic acid, and salts of these acids. Examples of the conductivity enhancer include an amide compound and the above-described aprotic solvents. The thickener is a component that increases viscosity of the first treatment solution, and examples of the thickener include various resins specific examples include a polyester resin, a polyimide resin, a polyamide resin, a polystyrene resin, a polyether resin, a polyvinyl alcohol resin, a (meth)acrylic resin, a phenol resin, a copolymer of two or more monomers, and derivatives of these resins and copolymer.

Examples of the pH adjuster include an alkaline compound as a component that adjusts the second treatment solution to a pH of 3 to 8. Specific examples include sodium hydroxide, potassium hydroxide, calcium hydroxide, ammonia, and amine compounds such as dimethylamine, diethylamine, imidazole, pyridine and amidine.

Examples of the alcohol include methanol, ethanol, 1-propanol, butanol, ethylene glycol, propylene glycol, glycerin, and polyethylene glycol. Other examples of the second component include various ester compounds, ether compounds, amide compounds, and nitrile compounds.

(vi) Step of Forming Solid Electrolyte Layer (Third Step)

Next, the second treatment solution obtained in the second step is applied to a surface of the dielectric layer and then dried as necessary to form a solid electrolyte layer. Here, it is important that the first period is longer than a period from a start of the second step to a start of the third step (second period). By not simply prolonging the first period but making the first period longer than the second period, the ESR of the resultant electrolytic capacitor becomes further low. The reason for this is considered to be that an effect brought about by adding the second component is maximally exhibited.

The second period refers to, in other words, a period from the start of the step of mixing the first treatment solution with the second component to the application of the resultant second treatment solution to the wound body. As described above, the second component is added to the first treatment solution for mainly improving the performance of the solid electrolyte layer. The addition of the second component sometimes changes a property of the resultant second treatment solution depending on a relationship (compatibility) between the second component and the conductive polymer. The change in the property deteriorates characteristics of the conductive polymer and further does not allow the effect brought about by adding an additive to be adequately exhibited, so that desired characteristics cannot be obtained.

Examples of the change in the property of the second treatment solution include a great increase in viscosity of the second treatment solution. The coagulant added as a second component coagulates particles of the conductive polymer to facilitate formation of a dense solid electrolyte layer. The thickener is added to improve the adhesive property of the second treatment solution to the dielectric layer and enhance coatability of an edge portion of the anode body. However, the coagulation and the thickening proceed over time to greatly increase the viscosity of the second treatment solution compared to the viscosity of the second treatment solution immediately after the addition. The great increase in the viscosity deteriorates flowability of the second treatment solution and further turns the second treatment solution into a gel to deteriorate permeability of the second treatment solution into the wound body. Therefore, an adequate solid electrolyte layer is not formed, leading to a result of a decrease in capacity or an increase in the ESR. Addition of a second component other than the coagulant and the thickener sometimes deteriorates liquid stability of the second treatment solution over time.

The effect brought about by adding the second component sometimes reduces over time. For example, the silane coupling agent has an effect of improving conductivity and withstand voltage characteristics by crosslinking the conductive polymer. On the other hand, a hydrolysis reaction and a polymerization reaction of the silane coupling agent proceed over time. Therefore, the effect brought about by adding the silane coupling agent reduces or the viscosity of the second treatment solution increases. The surfactant has an effect of improving an impregnation property of the second treatment solution into the wound body to improve electrostatic capacity; however, the surfactant deteriorates the liquid stability of the second treatment solution over time. The pH adjuster has an effect of shifting the pH of the second treatment solution to a neutral range and preventing damage to the dielectric layer to suppress an increase in leakage current; however, the pH adjuster deteriorates the liquid stability of the second treatment solution over time. This is because the second treatment solution is stable when the pH is low.

Therefore, the second period is preferably set as short as possible, which is the period from the start of the step of mixing the first treatment solution with the second component to the application of the resultant second treatment solution to the wound body. Particularly, the second period is preferably 12 hours or less.

In a generally commercially available mixed liquid (the second treatment solution in the present disclosure), a change over time in the property cannot be avoided. Therefore, an addition amount of a component corresponding to the second component is suppressed low to secure storage stability. For example, a mixed liquid is commercially available, which includes about 1% by mass of an aprotic solvent as a conductivity enhancer. This is because blending of more aprotic solvent makes a change over time in the property of the mixed liquid unavoidable for coagulation of a conductive polymer by the aprotic solvent. However, even when the solid electrolyte layer of a capacitor is formed with use of the mixed liquid including only about 1% by mass of the aprotic solvent, the effect of improving the conductivity is not adequate.

In the present disclosure, since the second period is shorter than the first period, the second component can be more mixed without much considering a change over time in the property. For example, even when the aprotic solvent (second component) is mixed in an amount ranging from 10 parts by mass to 60 parts by mass relative to 100 parts by mass of the first treatment solution, the second treatment solution can be applied to the wound body without causing coagulation of the conductive polymer. Therefore, the conductivity is further improved to give desired capacitor characteristics.

For example, the second component can be mixed in an amount ranging from 5 parts by mass to 80 parts by mass (both inclusive), from 5 parts by mass to 75 parts by mass (both inclusive), further from 10 parts by mass to 60 parts by mass (both inclusive), relative to 100 parts by mass of the first treatment solution. With the mixture ratio of the second component in these ranges, desired capacitor characteristics are easily attained.

A method for applying (impregnating) the second treatment solution to the wound body is not particularly limited, and there can be used, for example, a method for immersing the wound body in the second treatment solution contained in a container, a method for coating the wound body with the second treatment solution, and a method for dropping the second treatment solution onto the wound body. An impregnation period depends on a size of the wound body, and is, for example, 1 second to 5 hours, preferably 1 minute to 30 minutes. The impregnation may be conducted under reduced pressure. Further, ultrasonic vibration may be applied to the wound body or the second treatment solution while the wound body is impregnated with the second treatment solution.

This procedure allows formation of the solid electrolyte layer including the conductive polymer in such a manner as to cover at least a part of the surface of the dielectric layer. At this time, the solid electrolyte layer may be formed not only on the surface of the dielectric layer, but also on surfaces of cathode body 22 and separator 23.

Further, the wound body may be subjected to a drying treatment as necessary to remove at least a part of the first component and/or the second component with which the wound body has been impregnated. On this operation, the wound body may be heated to accelerate transpiration of the first component. The heating temperature ranges preferably from, for example, 50° C. to 300° C., particularly preferably from 100° C. to 200° C.

The step of applying the second treatment solution to the wound body and the step of drying the wound body conducted as necessary may be repeated twice or more. Conducting these steps a plurality of times can increase coverage of the solid electrolyte layer on the dielectric layer.

With the steps described above, the solid electrolyte layer is formed between anode body 21 and cathode body 22 to produce capacitor element 10. The solid electrolyte layer formed on the surface of the dielectric layer functions as a virtual cathode material.

(v) Step of Impregnating Capacitor Element with Nonaqueous Solvent or Electrolyte Solution After the formation of the solid electrolyte layer, the capacitor element may be impregnated with a nonaqueous solvent or an electrolyte solution. With such impregnation, a restoration function of dielectric layer 31 can be improved, and the effect of reducing the ESR can be further improved.

The nonaqueous solvent may be an organic solvent or an ionic liquid. The nonaqueous solvent is desirably a high boiling point solvent. There can be used, for example, polyhydric alcohols such as ethylene glycol and propylene glycol; cyclic sulfones such as sulfolane; lactones such as γ-butyrolactone; amides such as formaldehyde, N-methylacetamide, N,N-dimethylformamide, and N-methyl-2-pyrrolidone; esters such as methyl acetate; ethers such as 1,4-dioxane; and ketones such as methyl ethyl ketone.

There may be used an electrolyte solution obtained by dissolving an organic salt as an ionic substance (solute) in the nonaqueous solvent. The organic salt is a salt in which at least one of an anion and a cation includes an organic substance. As the organic salt, there can be used, for example, a salt of an organic amine and an organic carboxylic acid. Specific examples include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

A method for impregnating capacitor element 10 with the nonaqueous solvent or the electrolyte solution is not also particularly limited, but the method is preferably a method for immersing capacitor element 10 in the nonaqueous solvent or the electrolyte solution contained in a container, for simplicity of the method. An immersion period depends on a size of capacitor element 10, but may range, for example, from 1 second to 5 minutes. The impregnation can be conducted under reduced pressure.

(vi) Step of Encapsulating Capacitor Element

Finally, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or an alloy of these metals.

Next, sealing member 12 formed so as to allow lead wires 14A, 14B to penetrate the sealing member is disposed above capacitor element 10 to encapsulate capacitor element 10 in bottomed case 11. Sealing member 12 is sufficient as long as the sealing member is an insulating substance. As the insulating substance, an elastic body is preferable, and for example, high heat resistance silicone rubber, fluororubber, ethylene propylene rubber, Hypalon rubber, butyl rubber or isoprene rubber is especially preferable.

Next, bottomed case 11 is, at a part near an opening end, processed by transverse drawing, and is, at the opening end, swaged to sealing member 12 for curling. Then, base plate 13 is disposed on a curled part of the bottomed case to complete the electrolytic capacitor as shown in FIG. 1. Subsequently, an aging treatment may be performed while a rated voltage is applied.

In the exemplary embodiment described above, a wound electrolytic capacitor has been described. The application range of the present disclosure, however, is not limited to the wound electrolytic capacitor, and the present disclosure can also be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is described in more detail with reference to examples. The present disclosure, however, is not limited to the examples.

Example 1

In the present example, produced was a wound electrolytic capacitor (a) 8.0 mm×12.0 mm L (length)) having a rated voltage of 63 V and a rated electrostatic capacity of 33 μF. Hereinafter, a specific method for manufacturing the electrolytic capacitor is described.

(Preparation of Anode Body)

A 100-μm-thick aluminum foil was subjected to etching to roughen a surface of the aluminum foil. Then, a dielectric layer was formed on the surface of the aluminum foil by a chemical conversion treatment. The chemical conversion treatment was performed by immersing the aluminum foil in an ammonium adipate solution, followed by application of a voltage. Then, the aluminum foil was cut into a size of 6 mm (length)×120 mm (breadth) to prepare an anode body.

(Preparation of Cathode Body)

A 50-μm-thick aluminum foil was subjected to etching to roughen a surface of the aluminum foil. Then, the aluminum foil was cut into a size of 6 mm (length)×120 mm (breadth) to prepare a cathode body.

(Production of Wound Body)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body and the separator. Ends of the lead tabs protruding from the wound body were connected to an anode lead wire and a cathode lead wire, respectively. Then, the produced wound body was subjected to a chemical conversion treatment again to form a dielectric layer at a cut end of the anode body. Next, an end of an outer surface of the wound body was fixed with a fastening tape to complete the wound body.

(Preparation of First Treatment Solution)

A mixed solution was prepared by dissolving 3,4-ethylene dioxythiophene and dopant polystyrenesulfonic acid in ion-exchanged water (first component). To the resultant mixed solution, ferric sulfate (an oxidant) was added while the mixed solution was stirred, to cause a polymerization reaction. After the reaction, the resultant reaction solution was dialyzed to remove unreacted monomers and an excessive oxidant, so that a conductive polymer dispersion liquid (first treatment solution) was obtained, which included about 5% by mass of particles of polyethylene dioxythiophene doped with polystyrenesulfonic acid. The resultant conductive polymer dispersion liquid was left to stand still in an environment of 10° C. for 72 hours (first period).

(Preparation of Second Treatment Solution)

γ-Butyrolactone (second component) was added in an amount of 20 parts by mass to 100 parts by mass of the first treatment solution and uniformly dispersed to prepare a second treatment solution.

(Formation of Solid Electrolyte Layer)

The resultant second treatment solution was injected into a predetermined container. Next, the wound body was immersed in the second treatment solution injected into the predetermined container for 5 minutes in a reduced atmosphere of 40 kPa, and then the wound body was picked up from the second treatment solution. A second period was 6 hours, which was a period from a start of mixing the second component with the first treatment solution to the immersion of the wound body in the resultant second treatment solution. Next, the wound body that had been impregnated with the second treatment solution was dried in a drying furnace at 150° C. for 20 minutes to form a solid electrolyte layer including the conductive polymer on a surface of the dielectric layer, so that a capacitor element was obtained.

(Impregnation with Nonaqueous Solvent)

The capacitor element was immersed in a mixed solvent (nonaqueous solvent) of γ-butyrolactone and sulfolane for 5 minutes in a reduced atmosphere of 40 kPa, and then the capacitor element was picked up from the nonaqueous solvent.

(Encapsulation of Capacitor Element)

The capacitor element that had been impregnated with the nonaqueous solvent was encapsulated to complete an electrolytic capacitor. Specifically, first, the capacitor element was housed in a bottomed case so that the lead wires were positioned on an opening side of the bottomed case, rubber packing as a sealing member which was formed so as to allow the lead wires to penetrate the rubber packing was disposed above the capacitor element, and the capacitor element was encapsulated in the bottomed case. The bottomed case was, at a part near an opening end, processed by drawing, and was further, at the opening end, processed into a curl, and a base plate was disposed on a curled part, to complete the electrolytic capacitor as shown in FIG. 1. Subsequently, an aging treatment was performed at 130° C. for 2 hours while the rated voltage was applied.

For the resultant electrolytic capacitor, electrostatic capacity, ESR, and leakage current (LC) were measured. Also, for evaluation of reliability of the electrolytic capacitor, the electrolytic capacitor was retained at 125° C. for 1000 hours while the rated voltage was applied, and an increase rate of the ESR (ΔESR) was confirmed. The ΔESR was calculated from a ratio (X/X0) of the ESR after the retention for 1000 hours (X) to an initial value of the ESR (X0). A value of the ratio less than 1.2 was evaluated as ○, a value of 1.2 or more and less than 1.5 as Δ, and a value of 1.5 or more as ×. Each of the characteristics was acquired as an average of 300 samples. Results are shown in Table 1.

Further, a change in a property of the second treatment solution was evaluated from the viewpoint of flowability. Specifically, viscosity was measured immediately after the mixing of the second component and after the elapse of a predetermined second period, and immediately before the impregnation of the wound body, and evaluation was made by an increase rate of the viscosity. An increase rate of viscosity less than 1.2 times was evaluated as ○, an increase rate of viscosity of 1.2 times or more with a state of not turning into a gel as Δ, and an increase rate of viscosity of 1.2 times or more with a state of turning into a gel as ×. The viscosity was measured with a vibration-type viscometer (VISCOMATE VM-100A manufactured by SEKONIC CORPORATION) in an environment of 25° C.

Examples 2 to 4 and Comparative Example 1

An electrolytic capacitor was produced in the same manner as in Example 1 except that the second period was changed as shown in Table 1, and evaluation was conducted in the same manner as above. Results are shown in Table 1. In Comparative Example 1, the second component was mixed immediately after the preparation of the first treatment solution (first period: 0 h).

TABLE 1

| | Second component | Addition amount (part by mass) | First period | Second period | Flowability | Capacity (μF) | ESR (mΩ) | LC (μA) | ΔESR |
|---|---|---|---|---|---|---|---|---|---|
| Comparative Example 1 | γButyrolactone | 20 | 0 h | 72 h | × | Unavailable | — | — | — |
| Example 1 | γButyrolactone | 20 | 72 h | 6 h | ○ | 33.4 | 22.2 | 0.9 | ○ |
| Example 2 | γButyrolactone | 20 | 72 h | 12 h | ○ | 34 | 22.8 | 0.7 | ○ |
| Example 3 | γButyrolactone | 20 | 72 h | 24 h | Δ | 31 | 40.1 | 0.8 | Δ |
| Example 4 | γButyrolactone | 20 | 72 h | 48 h | Δ | 30.1 | 40.3 | 0.9 | Δ |

In Comparative Example 1, the viscosity of the second treatment solution was significantly increased, so that the capacitor element could not be impregnated with the second treatment solution. In Examples 1 to 4 in which the second component was added in the same amount as in Comparative Example 1, a change in the flowability of the second treatment solution was suppressed, and the ESR and the LC were suppressed low. Particularly, in Examples 1 and 2 in which the first period was set adequately longer than the second period, the effect of suppressing the ESR was high also after 1000 hours.

Examples 5 and 6 and Comparative Examples 2 and 3

An electrolytic capacitor was produced in the same manner as in Example 1 except that the second period was set to 12 hours and the first period was changed as shown in Table 2, and evaluation was conducted in the same manner as above. Results are shown in Table 2.

TABLE 2

| | Second component | Addition amount (part by mass) | First period | Second period | Flowability | Capacity (μF) | ESR (mΩ) | LC (μA) | ΔESR |
|---|---|---|---|---|---|---|---|---|---|
| Comparative Example 2 | γButyrolactone | 20 | 6 h | 12 h | ○ | 31 | 58.2 | 2.1 | × |
| Comparative Example 3 | γButyrolactone | 20 | 12 h | 12 h | ○ | 31.5 | 55.2 | 1.8 | × |
| Example 5 | γButyrolactone | 20 | 24 h | 12 h | ○ | 34.3 | 24.5 | 0.7 | ○ |
| Example 2 | γButyrolactone | 20 | 72 h | 12 h | ○ | 34 | 22.8 | 0.7 | ○ |
| Example 6 | γButyrolactone | 20 | 120 h | 12 h | ○ | 34.8 | 22.5 | 0.7 | ○ |

In Comparative Examples 2 and 3 in which the first period was the same as or shorter than the second period, a change in the flowability of the second treatment solution was not observed, while the ESR and the LC were large. In Examples 2, 5, and 6 in which the first period was set adequately longer than the second period, the ESR and the LC were suppressed very low.

Examples 7 to 12 and Comparative Example 4

An electrolytic capacitor was produced in the same manner as in Example 1 except that the first period was set to 72 hours, the second period was set to 12 hours, and the addition amount of the second component was changed as shown in Table 3, and evaluation was conducted in the same manner as above. Results are shown in Table 3. In Comparative Example 4, the second component was not added.

Comparative Example 5

An electrolytic capacitor was produced in the same manner as in Example 1 except that the addition amount of the second component was set to 1 part by mass, and the second component was mixed immediately after the preparation of the first treatment solution (first period: 0 h), and evaluation was conducted in the same manner as above. Results are shown in Table 3.

TABLE 3

| | Second component | Addition amount (part by mass) | First period | Second period | Flowability | Capacity (μF) | ESR (mΩ) | LC (μA) | ΔESR |
|---|---|---|---|---|---|---|---|---|---|
| Comparative Example 4 | γButyrolactone | — | 72 h | — | ○ | 29.7 | 120.5 | 2.4 | × |
| Comparative Example 5 | γButyrolactone | 1 | 0 h | 72 h | ○ | 30.3 | 105.2 | 3.9 | × |
| Example 7 | γButyrolactone | 5 | 72 h | 12 h | ○ | 34 | 37.4 | 0.9 | Δ |
| Example 8 | γButyrolactone | 10 | 72 h | 12 h | ○ | 34.1 | 26.9 | 0.5 | ○ |
| Example 2 | γButyrolactone | 20 | 72 h | 12 h | ○ | 34 | 22.8 | 0.7 | ○ |
| Example 9 | γButyrolactone | 40 | 72 h | 12 h | ○ | 33.8 | 22.2 | 0.7 | ○ |
| Example 10 | γButyrolactone | 60 | 72 h | 12 h | ○ | 34.8 | 22.5 | 0.7 | ○ |
| Example 11 | γButyrolactone | 80 | 72 h | 12 h | Δ | 30.1 | 33.2 | 0.4 | Δ |
| Example 12 | γButyrolactone + Dimethylamine phthalate * | 30 | 72 h | 12 h | ○ | 32.1 | 26.4 | 0.4 | ○ |

* γButyrolactone 20 parts by mass + Dimethylamine phthalate 10 parts by mass

In Examples 7 to 12, a change in the flowability of the second treatment solution was small even with an increased addition amount of the second component, and the ESR and the LC were suppressed low. In Comparative Example 5 in which only 1 part by mass of the second component was added, a change in the flowability was small, while the ESR and the LC were very large, so that the effect of the second component was not observed.

Examples 13 to 16

An electrolytic capacitor was produced in the same manner as in Example 1 except that the first period was set to 72 hours, the second period was set to 12 hours, the addition amount of the second component was set to 20 parts by mass, and a kind of the second component was changed as shown in Table 4, and evaluation was conducted in the same manner as above. Results are shown in Table 4.

TABLE 4

|  | Second component | Addition amount (part by mass) | First period | Second period | Flowability | Capacity (μF) | ESR (mΩ) | LC (μA) | ΔESR |
|---|---|---|---|---|---|---|---|---|---|
| Example 13 | Dimethyl sulfoxide | 20 | 72 h | 12 h | ○ | 33.8 | 22.1 | 0.4 | ○ |
| Example 14 | Sulfolane | 20 | 72 h | 12 h | ○ | 35.2 | 21.5 | 0.7 | ○ |
| Example 15 | Polyethylene glycol 400 | 20 | 72 h | 12 h | ○ | 33.6 | 23.7 | 0.5 | ○ |
| Example 16 | Trimethylamine | 20 | 72 h | 12 h | ○ | 34.3 | 24.7 | 0.6 | ○ |

In Examples 13 to 16, a change in the flowability of the second treatment solution was small regardless of the kind of the second component, and the ESR and the LC were suppressed low.

Examples 17 and 18 and Comparative Examples 6 and 7

An electrolytic capacitor was produced in the same manner as in Example 1 except that the first period, the second period, the addition amount of the second component, and the kind of the second component were changed as shown in Table 5, and evaluation was conducted in the same manner as above. In Comparative Examples 6 and 7, the second component was mixed immediately after the preparation of the first treatment solution (first period: 0 h). Results are shown in Table 5.

TABLE 5

|  | Second component | Addition amount (part by mass) | First period | Second period | Flowability | Capacity (μF) | ESR (mΩ) | LC (μA) | ΔESR |
|---|---|---|---|---|---|---|---|---|---|
| Example 17 | Sulfonated polyester | 10 | 72 h | 12 h | ○ | 33.9 | 21.6 | 0.5 | ○ |
| Comparative Example 6 | Sulfonated polyester | 10 | 0 h | 72 h | × | Unavailable | — | — | — |
| Example 18 | N-methyl-2-pyrrolidone | 20 | 72 h | 12 h | ○ | 34.2 | 22.3 | 0.6 | ○ |
| Comparative Example 7 | N-methyl-2-pyrrolidone | 20 | 0 h | 72 h | × | Unavailable | — | — | — |

In Examples 17 and 18, a change in the flowability of the second treatment solution was small regardless of the kind and addition amount of the second component, and the ESR and the LC were suppressed low. In Comparative Example 6 and 7, the viscosity of the second treatment solution was significantly increased, so that the capacitor element could not be impregnated with the second treatment solution.

The present disclosure can be used for electrolytic capacitors including a solid electrolyte layer as a cathode material.

What is claimed is:

1. A method for manufacturing an electrolytic capacitor that includes an anode body having a dielectric layer, and a solid electrolyte layer formed on a surface of the dielectric layer, the method comprising:
   a first step of preparing a first treatment solution by dissolving or dispersing a conductive polymer in a first component that is a liquid, to provide a conductive polymer solution or a conductive polymer dispersion liquid, and leaving the conductive polymer solution or the conductive polymer dispersion liquid to stand for a first period;
   a second step of preparing a second treatment solution by mixing the first treatment solution with a second component; and
   a third step of forming the solid electrolyte layer on the surface of the dielectric layer by applying the second treatment solution to the surface of the dielectric layer, wherein:
   the second component includes at least one component different from the conductive polymer and the first component, and
   the first period is longer than a second period, the first period being a period from an end of dissolving or dispersing the conductive polymer in the first component to a start of mixing the first treatment solution with the second component, the second period being a period from a start of mixing the first treatment solution with the second component to a start of applying the second treatment solution to the surface of the dielectric layer.

2. The method for manufacturing an electrolytic capacitor according to claim 1, wherein the second period is 12 hours or less.

3. The method for manufacturing an electrolytic capacitor according to claim 1, wherein the second component is mixed in an amount ranging from 5 parts by mass to 80 parts by mass, both inclusive, relative to 100 parts by mass of the first treatment solution.

4. The method for manufacturing an electrolytic capacitor according to claim 1, wherein the second component includes at least one selected from the group consisting of a coupling agent, a surfactant, a coagulant, a conductivity enhancer, a thickener, and a pH adjuster.

5. The method for manufacturing an electrolytic capacitor according to claim 1, wherein the second component includes at least one selected from the group consisting of an alcohol, an aprotic solvent, an ester compound, an ether compound, an alkaline compound, an amide compound, and a nitrile compound.

6. The method for manufacturing an electrolytic capacitor according to claim 1, wherein in the first step of preparing the first treatment solution, leaving the conductive polymer solution or the conductive polymer dispersion liquid under a temperature condition of 2° C. to 40° C.

* * * * *